United States Patent
Bausov et al.

(10) Patent No.: US 7,224,289 B2
(45) Date of Patent: May 29, 2007

(54) SLICKLINE DATA TRANSMISSION SYSTEM

(76) Inventors: Igor Bausov, 313 S. Fifth St., Raton, NM (US) 87740; Larry G. Stolarczyk, 848 Clayton Hwy., Raton, NM (US) 87740; Gerald L. Stolarczyk, 848 Clayton Hwy., Raton, NM (US) 87740; Eduardo Bonnin, 410½ Kearney, Raton, NM (US) 87740; Dennis Gibson, 1001 S.4th St., Raton, NM (US) 87740; John G. Howard, 909 Spruce, Trinidad, CO (US) 81082; Tito Leroy Sanchez, P.O. Box 1365, Raton, NM (US) 87740

( * ) Notice: Subject to any disclaimer, the term of this patent is extended or adjusted under 35 U.S.C. 154(b) by 222 days.

(21) Appl. No.: 11/112,943

(22) Filed: Apr. 25, 2005

(65) Prior Publication Data

US 2006/0244628 A1    Nov. 2, 2006

(51) Int. Cl.
*G01V 3/00*    (2006.01)

(52) U.S. Cl. .............................. 340/854.8; 340/854.4; 340/853.3; 340/853.7; 455/41.1

(58) Field of Classification Search ............. 340/853.3, 340/853.7, 854.4, 854.8; 455/41.1; 174/36
See application file for complete search history.

(56) References Cited

U.S. PATENT DOCUMENTS 4,006,315 A * 2/1977 Halstead .................... 455/41.1
5,894,104 A * 4/1999 Hedberg ...................... 174/36

OTHER PUBLICATIONS

Wikipedia, wireline definition last edited Dec. 18, 2006.*

* cited by examiner

*Primary Examiner*—Albert K. Wong
(74) *Attorney, Agent, or Firm*—Richard B. Main

(57) ABSTRACT

A slickline data transmission system for a high pressure oil-field well comprises inductive couplers at opposite ends of a slickline in order to establish real-time radio communication between down-the-hole logging toolstrings and supervisory control and data acquisition equipment on the surface. A frequency shift keyed (FSK) carrier centered around radio is used to send data up to the surface and commands back down to the toolstring. The toolstring itself can be a conventional one with a TDMA interface originally intended to be memory-dumped when the toolstring is returned to the surface.

7 Claims, 2 Drawing Sheets

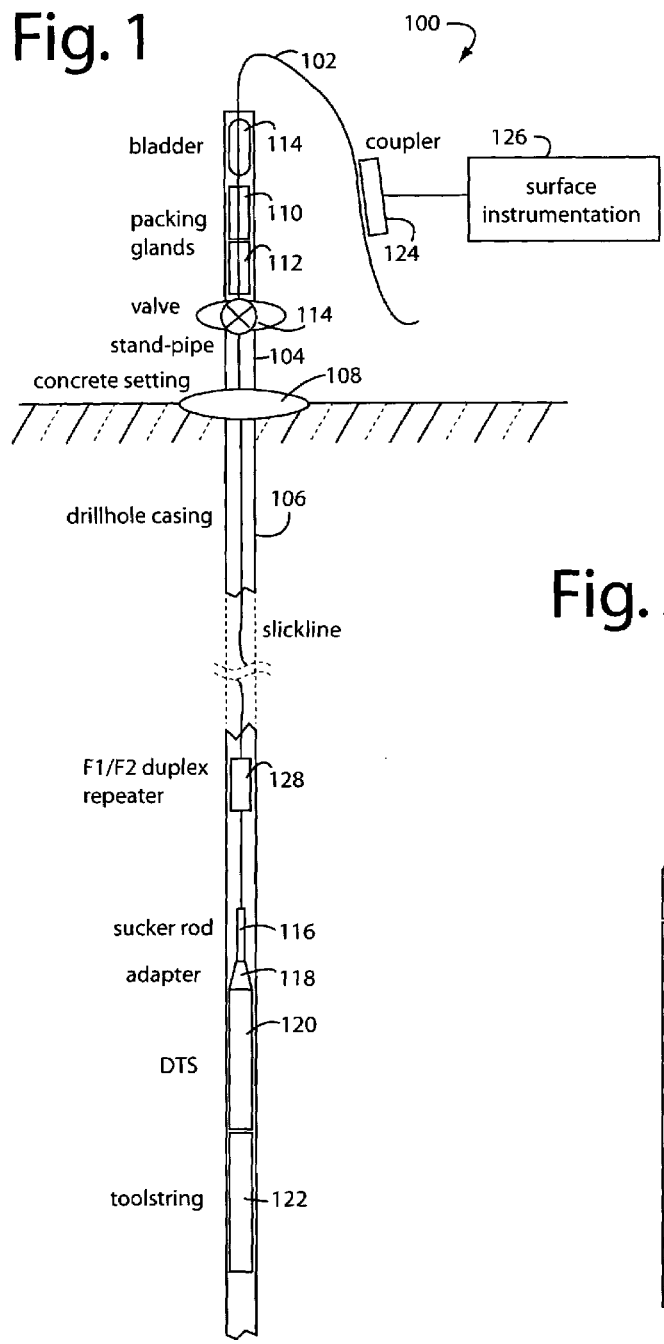
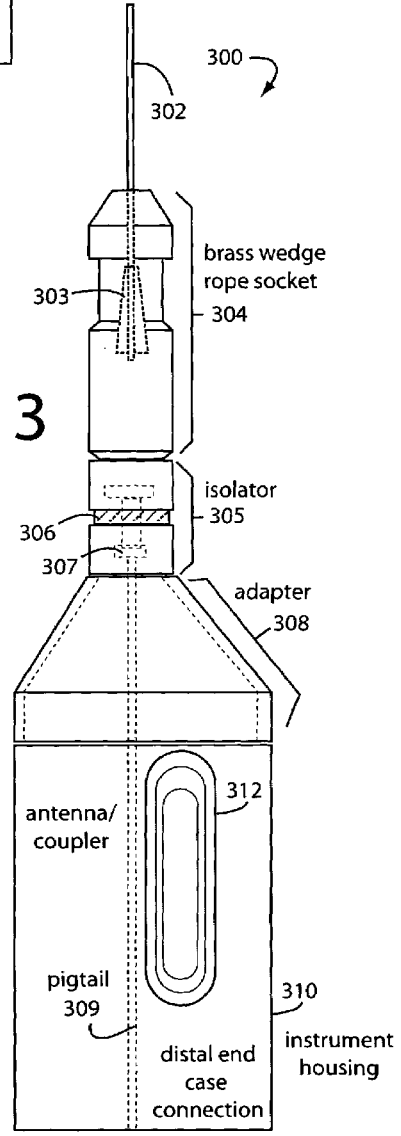

SLICKLINE DATA TRANSMISSION SYSTEM

BACKGROUND OF THE INVENTION

1. Field of the Invention

The invention relates generally to logging instrumentation for oil field wells, and more particularly to methods and instruments that can communicate topside over a standard, non-insulated slickline from substantial exploration depths.

2. Description of the Prior Art

The oil-field industry uses two basic types of logging methods to explore oil and gas wells, e.g., slickline and wireline. Dropping a series of sensing tools, such as porosity tools, gamma tools, pipe-collar detectors, etc. Getting the info out of the hole.

Wireline has a large-diameter cable that mechanically supports the hanging instrument. A wireline truck on the surface is required in support, and such is large and expensive. A data cable supplies power and provides a communication connection down the well to the instrument. But wireline data cable is very difficult to use in high-pressure wells because of its large diameters. The pressure on the well will work across the entire diameter at the top seals, so at high pressures only thin monofilaments are practical to seal.

Slickline techniques are used. But they are not real-time, and data is recorded in memory that is later read-out on the surface. Battery power only. Solid wire ⅛ inch to $60/1000$ inch, e.g., like piano-wire. Tool string can weigh 200 pounds, and such weigh may not be enough to pull the whole down given the well. Only the cable depth is provided. If the logging discovered something interesting, the whole procedure must be repeated.

Slickline logging tools have been developed in recent years to enable data collection in deep oil and gas wells. The well casing is completed by setting pipe and grouting it in place with cement. The cement seals the annulus between the soil and the outside diameter of the pipe. The top of the pipe is threaded and a blow-out preventer is screwed on. Such closing valve and a second pipe provide a sealable standpipe. The standpipe is long enough to accommodate a logging tool with a top sub attached to the slickline cable. The cable exits a lubricator through a sealing gland that enables the slick line to enter the sealed standpipe under pressure. When the gate valve is fully opened, the logging tool descends into the well casing, maintaining a seal with the slick line as the hoist lowers the logging tool into the holes.

Conventional slickline logging tools are designed with internal recording memory to log data during descent and ascent in the hole. After returning from the well, recorded digital data is read out on the surface and chart recordings are used to display the data for analysis.

What is needed is a data communication system that can support real-time data transmissions of oil-field logging instrumentation over conventional non-insulated solid-wire slicklines.

SUMMARY OF THE PRESENT INVENTION

Briefly, a slickline data transmission system embodiment of the present invention comprises radio frequency couplers at each end of a slickline that communicate with associated transceivers using radio FSK carriers. The down-the-hole data transmission system interfaces to standard toolstrings and communicates readings and data up to the surface equipment. Duplex repeaters are strategically positioned at intervals along very long slicklines. Commands can be issued and sent down to the toolstring as is commonly done in wireline systems.

An advantage of the present invention is that a data transmission system is provided that supports real-time communication with a down-the-hole toolstring on a conventional non-insulated solid-wire slickline.

A further advantage of the present invention is that a data transmission system is provided that interfaces directly to a slickline toolstring.

A still further advantage of the present invention is that a system is provided that saves rigging up and rigging down time on location.

Another advantage of the present invention is that a data transmission system is provided that supports perforating capability over a slickline used in real-time communication.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a diagram of a slickline data logging system embodiment of the present invention;

FIG. 3 is a side view diagram of a slickline attachment embodiment of the present invention.

DETAILED DESCRIPTION OF THE PREFERRED EMBODIMENTS

Figure 2:
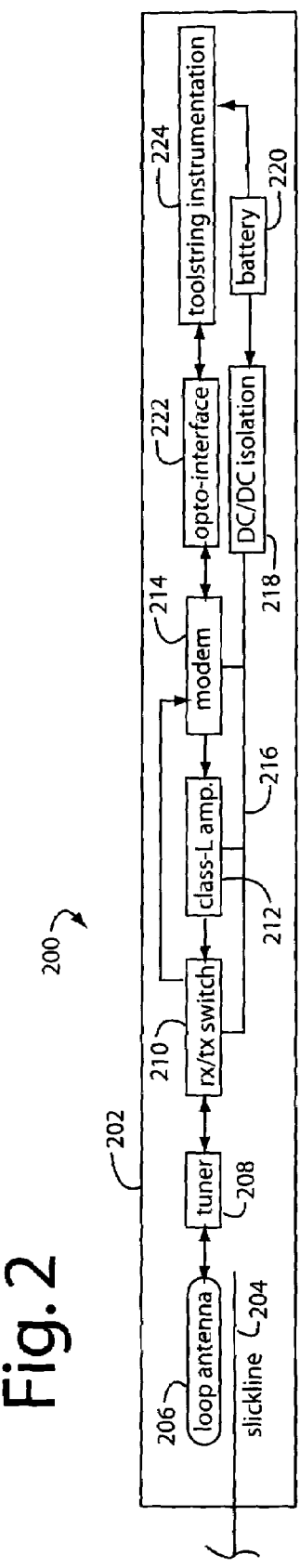
FIG. 2 is a functional block diagram of a data transmission system embodiment of the present invention.

FIG. 1 represents a slickline data logging system, and is referred to herein by the general reference numeral 100. The system 100 is used in an oil-field at a well. A slickline 102, resembling a piano wire 0.060 to 0.125 inches in diameter is used to support a down-the-hole instrument package. The slickline feeds down from the surface through a standpipe 104 connected to a drillhole casing 106. These are secured in a concrete setting 108. Industry standard slickline wires are made of stainless steel and are not insulated. It may be advantageous in embodiments of the present invention to use slicklines with metal oxide or polymer film insulating coatings to provide for electrical insulation and better signal transmission down hole. In any event, to be a commercial success, embodiments of the present invention are retrofittable to existing conventional equipment.

Very high pressures can exist within drillhole casing 106, and so greased packing glands 110 and 112 are used to seal the slickline 102 against the pressure inside the standpipe 104. Typically, these packing glands 110 and 112 are split plugs that can be clamped around the slickline and stuffed inside the standpipe 104 with special slickline grease. Each packing gland 110 and 112 is about one foot long, has a 0.050 inch clearance, and each can seal a pressure differential of 1500 PSI. Sealing 15,000 PSI will therefore require ten such packing glands. An air bladder 114 is inflated inside standpipe 104 to retain the packing glands 110 and 112.

A valve 114 is used as a blow-out preventer and can be used to close down and seal around slickline 102. If necessary, it can cut through slickline 102 and close off completely. But doing so would jettison the down-the-hole instrument package and be very costly.

The down-the-hole instrument package is mechanically hoisted by a sucker rod 116 connection with an adapter 118 to a data transmission system (DTS) 120 and a toolstring 122. The toolstring uses industry standard time division multiple access (TDMA) pulse communication formats and interfaces to report data and to respond to commands. For example, it uses the interface standard with the Scientific Data Warrior System.

According to company information published by Scientific Data, the Warrior Well Logging System comprises a tool interface and power supply panel, a computer, a printer and optional depth, line speed, line weight panel, and perforating power supply. The software supports cased hole logging tools from a wide selection of tool manufacturers. The tool interface panel contains circuits to interface to cased hole tools, both analog and digital. The depth encoder and line weight interfaces are built into the panel, as is the down hole tool power supply. All functions are digitally controlled from the software, with the power supply having a manual control mode. The panel incorporates data acquisition functions primary DSP based, that interface to a host computer through the industry standard Universal Serial Bus (USB). A seven port USB hub is also incorporated inside the panel allowing a single cable connection to the host computer. The computer runs Windows 98, ME, 2000, or XP, with a USB port. A second monitor may be attached to provide a hoistman's or client's display. The system supports thermal well log plotters and color printers. A depth, line speed and line weight panel provides 12-VDC powered, independent depth measurement. It connects to the host computer through the USB and is synchronized from the host depth or the host depth may be read from the depth panel. An optional perforating power supply is available. The software provides all the usual well logging functions and supports tools from a wide selection of manufacturers.

Embodiments of the present invention provide an inductively coupled radio communication link between a surface data logger and the down-the-hole logging tool. For example, a coupler 124 allows a surface instrumentation 126 to communicate over a radio frequency shift keyed (FSK) carrier with the DTS 120. A software programmable digital modem inside the DTS 120 provides for signal and format translations compatible with toolstring 122.

The standpipe 104 can comprise a non-metallic chamber storing multiple radio repeaters. These can be snapped on the slickline at various intervals when needed to ensure high signal-to-noise ratio during descent of the logging tool into the well. The coupler 124 is a loop antenna and can be axially or longitudinally wound with or without a ferrite core. The best choice between cores and windings depends on the particular installation and the nature of the well being instrumented. A surface instrument 126 provides for user readout of data being transmitted by the toolstring 122. It can further provide for issuing commands to the toolstring 122, e.g., to operate a perforating device.

Extremely long slickline applications may require the inclusion of a duplex repeater 128. A simple repeater receives on an F1 frequency, stores the demodulated data, and retransmits it again on the same F1 frequency. A more elaborate repeater can communicate on a first frequency F1 with the surface instrumentation 126, while simultaneously translating and communicating with the DTS 120 on a second frequency F2. Multiple repeaters 128 may be used at intervals for even longer slicklines or where the attenuation losses warrant.

FIG. 2 represents a data transmission system (DTS) embodiment of the present invention, and is referred to herein by the general reference numeral 200. The DTS 200 here is similar to the one shown in FIG. 1 but includes the toolstring. DTS 200 comprises a protective housing 202 that is lowered into a borehole on the end of a slickline 204. A pigtail section of the slickline extends inside and is inductively coupled to by a loop antenna 206. Its distal end is grounded to the casing.

Experiments conducted have tested various antenna configurations including longitudinal winding, axial winding, air core, ferrite core, coaxial, and side-by-side arrangements. Prototypes have used loop antennas with 3-ohm input impedances. The antenna resonance is trimmed at the factory with a tuner 208 to get a purely resistive impedance at the operating frequency of radio. Other frequencies could be used, especially if there is noise on this particular channel. A simplex system is shown here, but a full-duplex system with different transmit and receive frequencies could also be used.

A receive/transmit (Rx/Tx) switch 210 accepts amplified transmission signals from a class-L amplifier 212. During receive mode, it steers signals received down the slickline 204 to a modem 214. A tuning capacitor is placed in parallel during receive, and in series during transmit. The class-L amplifier 212 can be implemented as is described in U.S. patent application Ser. No. 10/046,793, filed Nov. 15, 2002, and Ser. No. 11/062,241, filed Feb. 22, 2005 now U.S. Pat. No. 6,993,302, by two of the present inventors, I. BAUSOV and L. STOLARCZYK.

An isolated ground and power distribution 216 is provided by a DC/DC isolator 218 from a toolstring battery 220. The power isolation, and DC signal isolation provided by an opto-isolator 222 are needed to be able to induce signals on the pigtail slickline 204. Otherwise, the FSK signals would be shorted out to case 202.

Modem 214 is fully programmable and completely under software control. Digital signal processing (DSP) techniques are used to input and output a very flexible range of signal formats, carriers, and modulations. Here, in this embodiment, the modem 214 interfaces with radio FSK transmissions on slickline 204 and translates the modulation format to suit the industry standard toolstring TDMA communications with a toolstring instrumentation 224. Such toolstring instrumentation is conventional, and so is not described further herein.

In one embodiment, modem 214 is programmed to look for quiet channel frequencies on the slickline and to then use those quiet channels for subsequent communication sessions. Other embodiments may be addressable. Modem 214 may also adopt code division multiple access (CDMA) modulation communication formats in particularly noisy and attenuated applications. The CDMA communication common to the global positioning system (GPS) is one example of how to receive exceedingly faint signals.

Embodiments of the present invention enable slickline toolstring instrumentation 224 to operate in a real-time mode, as do conventional wireline toolstrings. Essentially, this means the surface can communicate with the toolstring while down-the-hole.

FIG. 3 illustrates a slickline instrument attachment 300 that allows an internal antenna to couple signals to the distal end of a slickline. Attachment 300 comprises a slickline 302 that is locked onto with a brass wedge 303 inside a wire rope socket (sucker rod) 304. An isolator 305 screws onto the bottom of rope socket 304 and electrically isolates the bottom part with an insulator washer 306 and an insulated bolt 307. Bolt 307 is in electrical contact with slickline 302, but its bottom half is isolated from but still carries the weight of an adapter 308. A pigtail 309 contacts bolt 307, e.g., with a spring-loaded pin, and terminates at a distal end inside an instrument housing 310. A loop antenna 312 is coupled to the pigtail 309 to induce and receive signals in the rest of slickline 302.

High pressure wells are also associated with high temperatures. So the construction of the DTS 200 (FIG. 2) must include materials and techniques that will allow the electronics to operate properly. A metal chassis is used as a foundation to which are attached several printed circuit boards (PCB's). Polyethylene ketone (PEK), mica, and other high temperature insulation materials are used to electrically isolate the PCB's from the metal chassis. This allows ground and power distribution 216 to float relative to the chassis and protective housing 202.

In extreme high temperature applications, the semiconductors used to implement the various electronics modules will need to be selected types, e.g., military types. The chassis and its PCB's may also need to be enclosed in a protective and insulative Dewar flask.

Figure 4:
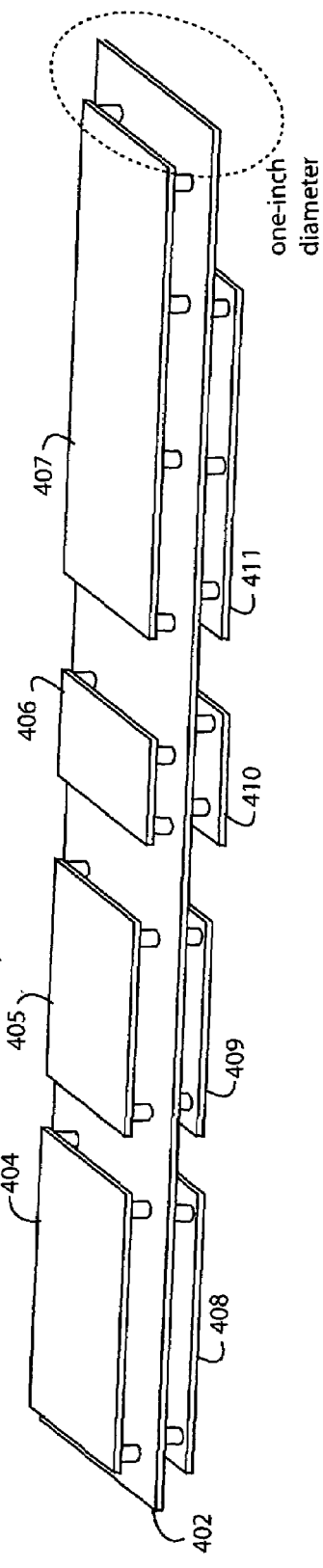
FIG. 4 is a perspective view diagram of a DTS embodiment of the present invention to fit within a one-inch diameter tubing.

FIG. 4 represents a DTS 400 that has been implemented to fit within a one-inch tube. A metal chassis 402 has mounted to it several individual PCB's 404–411. These PCB's implement the functional blocks illustrated in FIG. 3, and can further include modules for navigation, power control, etc. A navigation module would be useful in generating a dead reckoning position solution. The power control module would be useful to turn off other functions that will not be needed until later.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A slickline communication system, comprising:

a slickline;

a loop antenna for inductively coupling a radio signal to the slickline; and a radio transmitter connected to the loop antenna and coupled to a toolstring for modulating a radio carrier with data it receives from the toolstring;

wherein, real-time communication of said data from said toolstring to the surface via the slickline is provided.

2. The system of claim 1, further comprising:

a pigtail wire attached to the distal end of said slickline and providing for said inductive coupling from the loop antenna while inside a tool casing in a borehole.

3. The system of claim 1, further comprising:

a repeater attached at an intermediate point along said slickline and providing for an extension of the distance over which the system can transmit data from said toolstring to the surface.

4. The system of claim 1, further comprising:

a class-L amplifier disposed within the radio transmitter and providing said radio carrier with modulation for the loop antenna.

5. The system of claim 1, further comprising:

a software programmable digital signal processing modem disposed within the radio transmitter and providing said modulation in a choice of formats, and said carrier in a choice of frequencies.

6. The system of claim 1, further comprising:

a software programmable digital signal processing modem disposed within the radio transmitter and providing translations of encoding formats from said toolstring to said modulation in a choice of formats.

7. A slickline data transmission system for a high Pressure oil-filed well comprises:

a slickline;

inductive couplers at opposite ends of the slickline to establish real-time radio communication between a down-the-hole logging toolstring and supervisory control and data acquisition equipment on the surface; and a frequency shift keyed carrier radio coupled to the slickline and the toolstring to send data up to the surface and commands back down to the toolstring;

wherein, the toolstring includes a TDMA interface to be memory-dumped when the toolstring is returned to the surface.

* * * * *